United States Patent
Hoover et al.

(10) Patent No.: US 12,269,599 B2
(45) Date of Patent: Apr. 8, 2025

(54) AIRCRAFT SEAT WITH DOUBLE SHEAR TRACK FITTING ASSEMBLY

(71) Applicant: AMI Industries, Inc., Colorado Springs, CO (US)

(72) Inventors: Douglas E. Hoover, Colorado Springs, CO (US); Chad R. Pacheco, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 18/226,325

(22) Filed: Jul. 26, 2023

(65) Prior Publication Data

US 2025/0033777 A1  Jan. 30, 2025

(51) Int. Cl.
*B64D 11/06* (2006.01)

(52) U.S. Cl.
CPC .............................. *B64D 11/0696* (2013.01)

(58) Field of Classification Search
CPC ............ B64D 11/0696; B64D 11/0697; B64D 11/0698
See application file for complete search history.

(56) References Cited

U.S. PATENT DOCUMENTS

| | | |
|---|---|---|
| 4,508,385 A | 4/1985 | Bowman |
| 10,611,485 B2 | 4/2020 | Emrich et al. |
| 2018/0194476 A1* | 7/2018 | Gross ................. B60N 2/01516 |
| 2019/0308736 A1 | 10/2019 | Gross |
| 2020/0031475 A1* | 1/2020 | Gross ................. B64D 11/0696 |
| 2022/0089288 A1 | 3/2022 | Warren et al. |
| 2022/0242577 A1* | 8/2022 | Thisius ................. B60N 2/005 |
| 2023/0144561 A1 | 5/2023 | Pacheco et al. |

FOREIGN PATENT DOCUMENTS

| | | |
|---|---|---|
| EP | 2360095 A1 | 8/2011 |
| EP | 2665647 B1 | 2/2018 |
| GB | 2419854 A | 5/2006 |

OTHER PUBLICATIONS

European Search Report received in EP Application No. 24188705.8, Nov. 18, 2024, 9 pages.

* cited by examiner

*Primary Examiner* — Rodney A Bonnette
(74) *Attorney, Agent, or Firm* — Suiter Swantz IP

(57) ABSTRACT

A double-shear secured vehicle seating assembly includes an operator seat (e.g., for a pilot or operator of a rotorcraft or like vehicle) and a seat frame structure via which the operator seat is secured to floor tracks in the cabin floor. Floor track grippers attached to the underside of the seat frame structure "grip" the floor tracks by extending down and around an upper portion of the floor track. The floor track grippers are further united with the floor tracks by locking pins that extend through holes in the grippers as well as the floor track itself, which includes a rail and a plurality of evenly spaced holes extending through the rail. The locking pin fully pierces the floor track gripper on a first side, fully piercing the aligned hole in the rail, and at least partially piercing the floor track gripper on the opposing side, creating the double-shear condition.

8 Claims, 4 Drawing Sheets

US 12,269,599 B2

AIRCRAFT SEAT WITH DOUBLE SHEAR TRACK FITTING ASSEMBLY

BACKGROUND

Pilot or operator seats for rotorcraft or other aircraft require a robust attachment of the underlying seat base structure to floor tracks set into or otherwise attached to the cockpit or cabin floor. Conventional seat structure approaches employ a single-shear locking pin that pierces through a floor track gripper as well as the floor track itself. However, under sufficiently high loading conditions, e.g., sufficient to warp the cockpit or cabin floor, the locking pin may be bent and dislodged from the floor track, enabling the seat structure to break away from the cockpit floor.

SUMMARY

In a first aspect, a double-shear secured vehicle seating assembly for a rotorcraft, aircraft, or like vehicle/mobile platform is disclosed. In embodiments, the seating assembly includes a seat frame structure. The seat frame structure supports the vehicle seat proper, and attaches to the vehicle floor via floor track grippers attached to the underside of the seat frame structure. Each floor track gripper secures the seat frame structure to floor tracks set into the vehicle floor, e.g., a set of two parallel floor tracks. Each floor track includes a rail extending parallel with the vehicle floor, with evenly spaced holes extending through the rail. Above the rail, the upper portion of the floor track extends parallel to the floor and perpendicular to the rail (e.g., to the left and right of the rail). Each floor track gripper has a base attaching to the seat frame structure and left and right side portions extending below the base, such that the left and right side portions "grip" the upper portion of the floor track by extending around and below the upper portion on each side. The left and right side portions of the floor track gripper each include a hole extending fully through each side portion and alignable to the holes extending through the floor track rail. A locking pin further secures each floor track gripper to the floor track; when engage, the locking pin extends fully through the hole on one side of the floor track gripper, fully through an aligned hole in the rail, and at least partially through the corresponding hole on the other side of the floor track gripper.

In some embodiments, the locking pin is connected to a control lever mounted on the vehicle seat by a cable. For example, the occupant of the seat may articulate the control lever to engage the locking pin (or disengage the locking pin from the engaged state).

In some embodiments, the locking pin is set into a spring-loaded housing and held in the engaged state by compression springs. The occupant of the seat may disengage the locking pin by articulating the control lever to compress the springs and retract the locking pin from the floor track rail hole (and from the opposite-side hole in the floor track gripper) or release the compression springs to drive the locking pin into the engaged position (e.g., fully piercing the rail and the floor track gripper on one side, and partially piercing the floor track gripper on the opposing side).

In some embodiments, when in the engaged state, the locking pin fully pierces the floor track gripper (e.g., the left-side and right-side holes therethrough) in addition to the floor track rail.

In a further aspect, a vehicle operator seating assembly (e.g., for a pilot, co-pilot, or other operator of a rotorcraft, aircraft, or like vehicle or mobile platform) is also disclosed. In embodiments, the operator seating assembly includes an operator seat for accommodating the pilot or operator. For example, the seat may comprise a set of several components, e.g., a seatback and seatpan, or a single-component operator seat. The operator seat is supported, and mounted to a cabin floor of the vehicle, by a seat frame structure that attaches to the cabin floor via floor track grippers attached to the underside of the seat frame structure. Each floor track gripper secures the seat frame structure to floor tracks set into the cabin floor, e.g., a set of two parallel floor tracks. Each floor track includes a rail extending parallel with the cabin floor, with evenly spaced holes extending through the rail. Above the rail, the upper portion of the floor track extends parallel to the floor and perpendicular to the rail (e.g., to the left and right of the rail). Each floor track gripper has a base attaching to the seat frame structure and left and right side portions extending below the base, such that the left and right side portions "grip" the upper portion of the floor track by extending around and below the upper portion on each side. The left and right side portions of the floor track gripper each include a hole extending fully through each side portion and alignable to the holes extending through the floor track rail. A locking pin further secures each floor track gripper to the floor track; when engage, the locking pin extends fully through the hole on one side of the floor track gripper, fully through an aligned hole in the rail, and at least partially through the corresponding hole on the other side of the floor track gripper.

In some embodiments, the locking pin is connected to a control lever mounted on the vehicle seat by a cable. For example, the occupant of the seat may articulate the control lever to engage the locking pin (or disengage the locking pin from the engaged state).

In some embodiments, the locking pin is set into a spring-loaded housing and held in the engaged state by compression springs. The occupant of the seat may disengage the locking pin by articulating the control lever to compress the springs and retract the locking pin from the floor track rail hole (and from the opposite-side hole in the floor track gripper) or release the compression springs to drive the locking pin into the engaged position (e.g., fully piercing the rail and the floor track gripper on one side, and partially piercing the floor track gripper on the opposing side).

In some embodiments, when in the engaged state, the locking pin fully pierces the floor track gripper (e.g., the left-side and right-side holes therethrough) in addition to the floor track rail.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
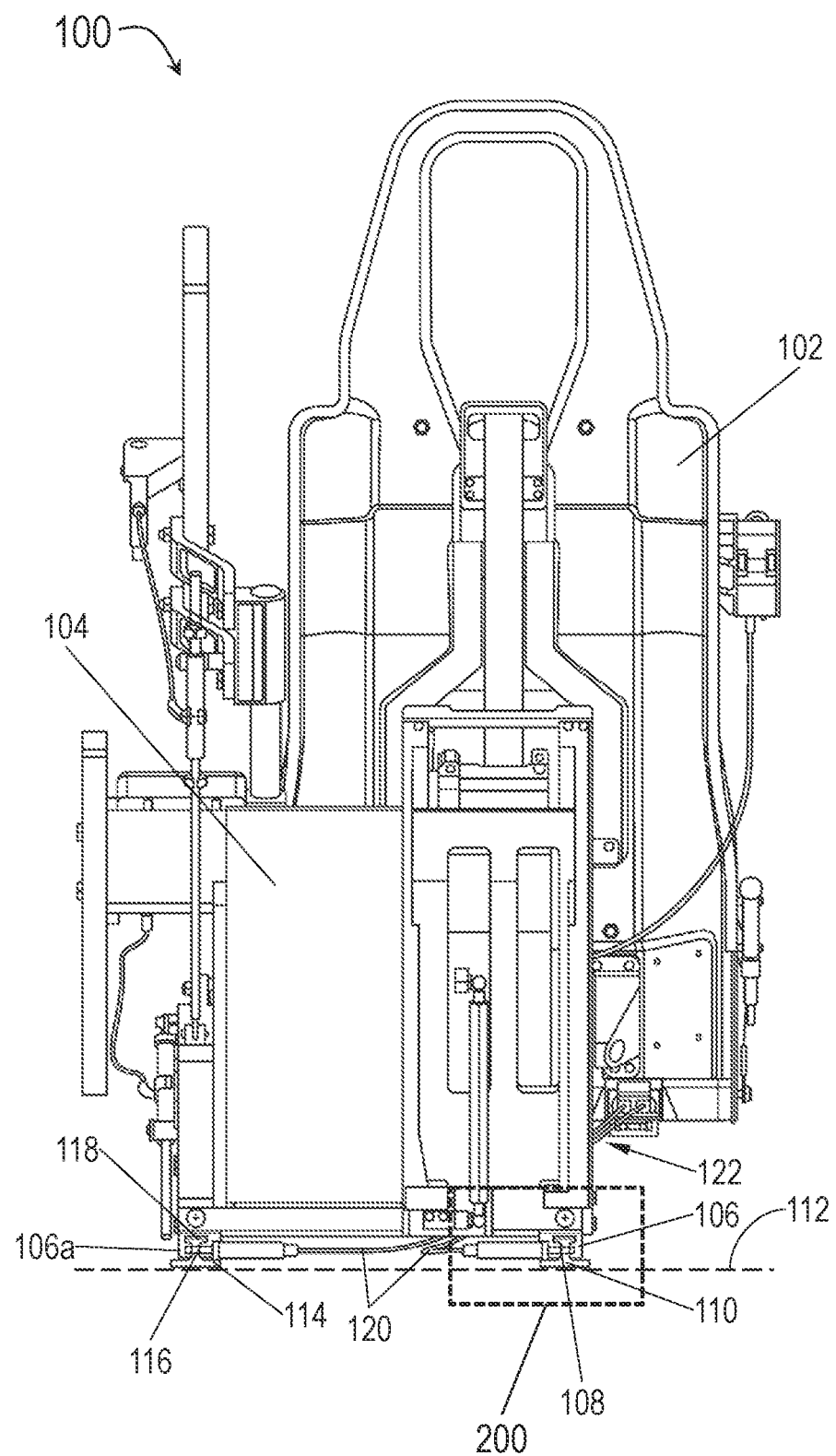
FIG. 1 is a rear view of a vehicle seat secured to a cabin floor via a double-shear locking assembly according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a pilot or operator seat for a rotorcraft, aircraft, or other vehicle wherein the seat may be subjected to excessive loading, e.g., associated with an impact event. By securing the seating assembly to the cabin floor tracks via double-shear locking assemblies, the seat is kept intact with the cabin floor during emergency landings and other like impact events, significantly increasing survivability for the seat occupant. For example, the seating assembly includes floor track grippers that "grip" the floor track by extending below an upper portion of the floor track on both sides. The floor track grippers are secured to the floor track by a locking pin that fully pierces the floor track gripper on one side of the floor track rail (in addition to piercing the rail itself) but also pierces the floor track gripper on the other side of the floor track rail, creating the double-shear condition.

Referring to FIG. 1, a vehicle seating assembly 100 is shown. The vehicle seating assembly 100 may include an operator seat 102, seat structure 104, floor track gripper 106, and double-shear locking pin 108.

In embodiments, the operator seat 102 may accommodate a pilot, co-pilot, crewmember, or other operator of a rotorcraft, aircraft, or like vehicle/mobile platform. For example, the operator seat 102 may include seatpan and seatback components or may combine these elements into a single seat.

In embodiments, the seat structure 104 may support the operator seat 102. For example, the seat structure 104 may be attached to floor tracks 110 set into (or otherwise attached) to a floor 112 of a cockpit or cabin of the vehicle. In some embodiments, the operator seat 102 may be adjustable relative to the seat structure, e.g., via lateral tracking and/or height adjustment.

In embodiments, floor tracks 110 may be set into or attached to the floor 112, e.g., in pairs of parallel floor tracks extending along the cabin floor substantially parallel to a longitudinal axis of the vehicle. For example, each floor track 110 may be bolted or otherwise secured to the cabin floor 112 via a lower portion 114. In embodiments, each floor track 110 may further include a rail 116 extending vertically above the lower portion 114, parallel to the cabin floor 112. Each floor track 110 may still further terminate in an upper portion 118 extending perpendicular to the rail 116 (e.g., substantially horizontally, relative to the rail) to the left and right sides of the rail (e.g., also perpendicular to the floor track, and parallel to the cabin floor 112).

Figure 2:
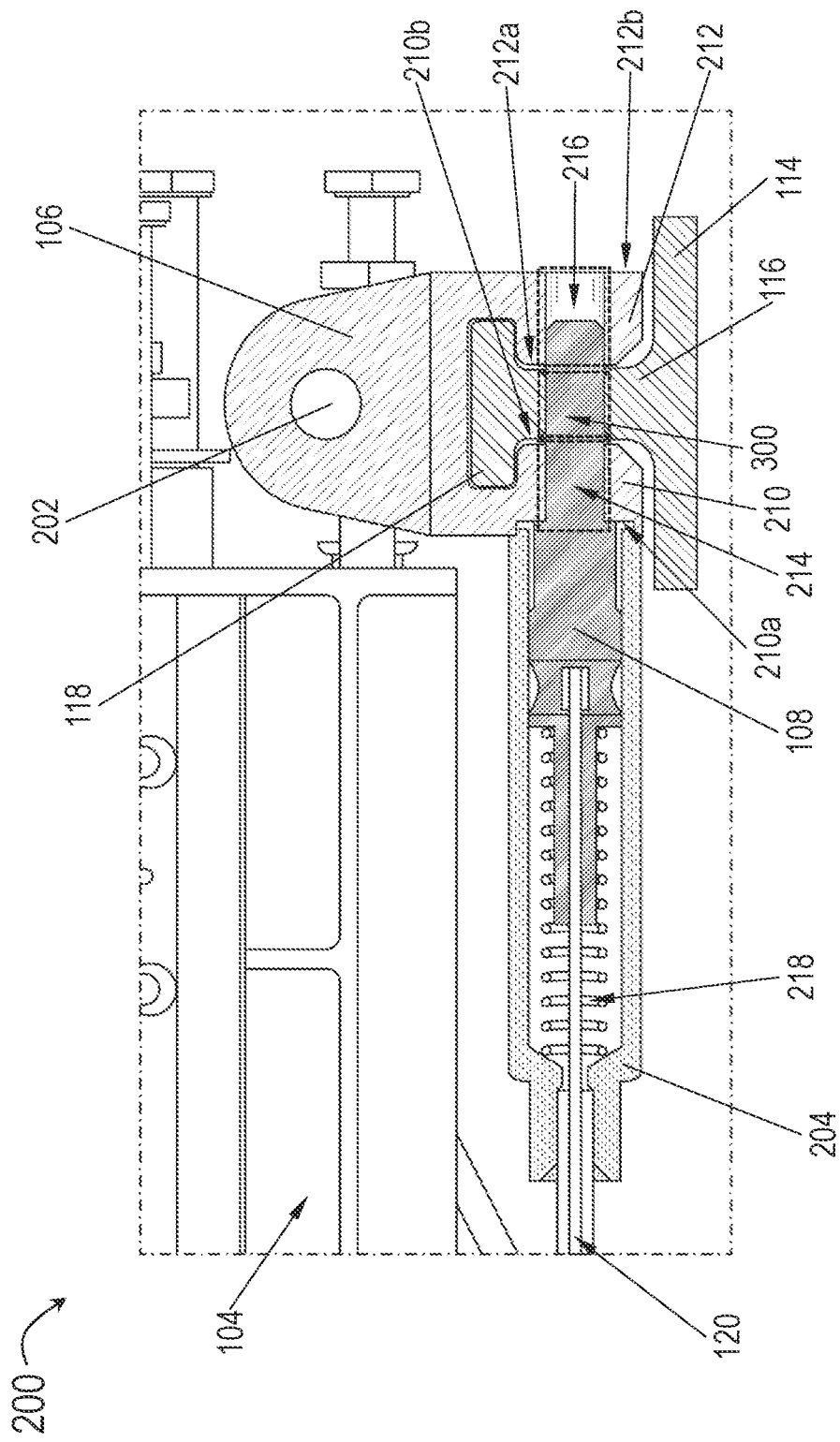
FIG. 2 is a cross-section view of the double-shear locking assembly of FIG. 1.

Referring also to FIG. 2, a detailed view 200 of the vehicle seating assembly 100 (in particular, a right-side portion of the seat structure 104) is shown in cross section.

In embodiments, each floor track gripper 106 may be attached to the underside of the seat structure 104 (e.g., via bolt 202). For example, each floor track gripper 106 may be a substantially U-shaped bracket capable of saddling the upper portion 118 of a floor track 110, the floor track gripper including left-side and right-side portions allowing the floor track gripper to "grip" the floor track by extending around and below the upper portion on both the left and right sides of the floor track. Further, the left-side and right-side portions of the floor track gripper 106 may extend below a portion of the rail 116, terminating above the lower portion 114. In embodiments, each floor track gripper 106 may include holes (not shown) in its left-side and right-side portions, the holes alignable with similar holes (not shown) extending laterally through the rail 116 from the left to the right side.

In embodiments, the floor track grippers 106, and thus the seat structure 104, may be secured to the floor tracks 110, and thus to the cabin floor 112, via double-shear locking pins 108 extending through at least three walls of the floor track grippers. For example (and as shown in greater detail below)

the locking pins 108 may extend fully through an interior side of the floor track gripper 106 (e.g., the left-side portion of right-side floor track gripper 106, the right-side portion of left-side floor track gripper 106a), fully through the rail 116, and partially through an exterior side of the floor track gripper (e.g., the right-side portion of right-side floor track gripper 106, the left-side portion of left-side floor track gripper 106a). In embodiments, the floor track 110 may operate similarly to a lug and the floor track gripper 106 may operate similarly to a U-shaped bracket saddling the lug, with the double-shear locking pins 108 uniting the floor track gripper to the floor track.

In some embodiments, the locking pins 108 may be situated within a housing 204 and connected (e.g., via cable 120, FIG. 1) to a control lever (122, FIG. 1) articulable by the occupant of the operator seat 102. For example, the locking pins 108 may be engaged or disengaged via the control lever as described below.

In embodiments, referring in particular to FIG. 2, the floor track gripper 106 may include a left-side portion 210 and right-side portion 212 extending around and below the upper portion 118 of the floor track 110 on both sides of the floor track (as opposed to just the inside/left side of the floor track). For example, referring also to FIGS. 3 and 4, the rail 116 may include a series of evenly spaced holes 300, each hole extending fully through the rail from its left side to its right side.

In embodiments, both the left-side portion 210 and right-side portion 212 of the floor track gripper 106 may include a similarly proportioned hole 214, 216 alignable to each hole 300 extending through the rail 116.

In embodiments, referring back to FIG. 2, the double-shear locking pin 108 may be situated within a housing 204 further including a compression spring 218. For example, the compression spring 218 may be configured to maintain the locking pin 108 in an engaged state, wherein the locking pin pierces at least three walls of the floor track gripper 106, e.g., the outer and inner walls 210a, 210b of the left-side portion 210 and the inner wall 212a of the right-side portion 212 (via holes 214, 300, 216). In some embodiments, the locking pin 108 may be retracted free of the floor track gripper 106 and floor track 110 and into the housing 204, e.g., via the control lever (208, FIG. 1).

Figure 3:
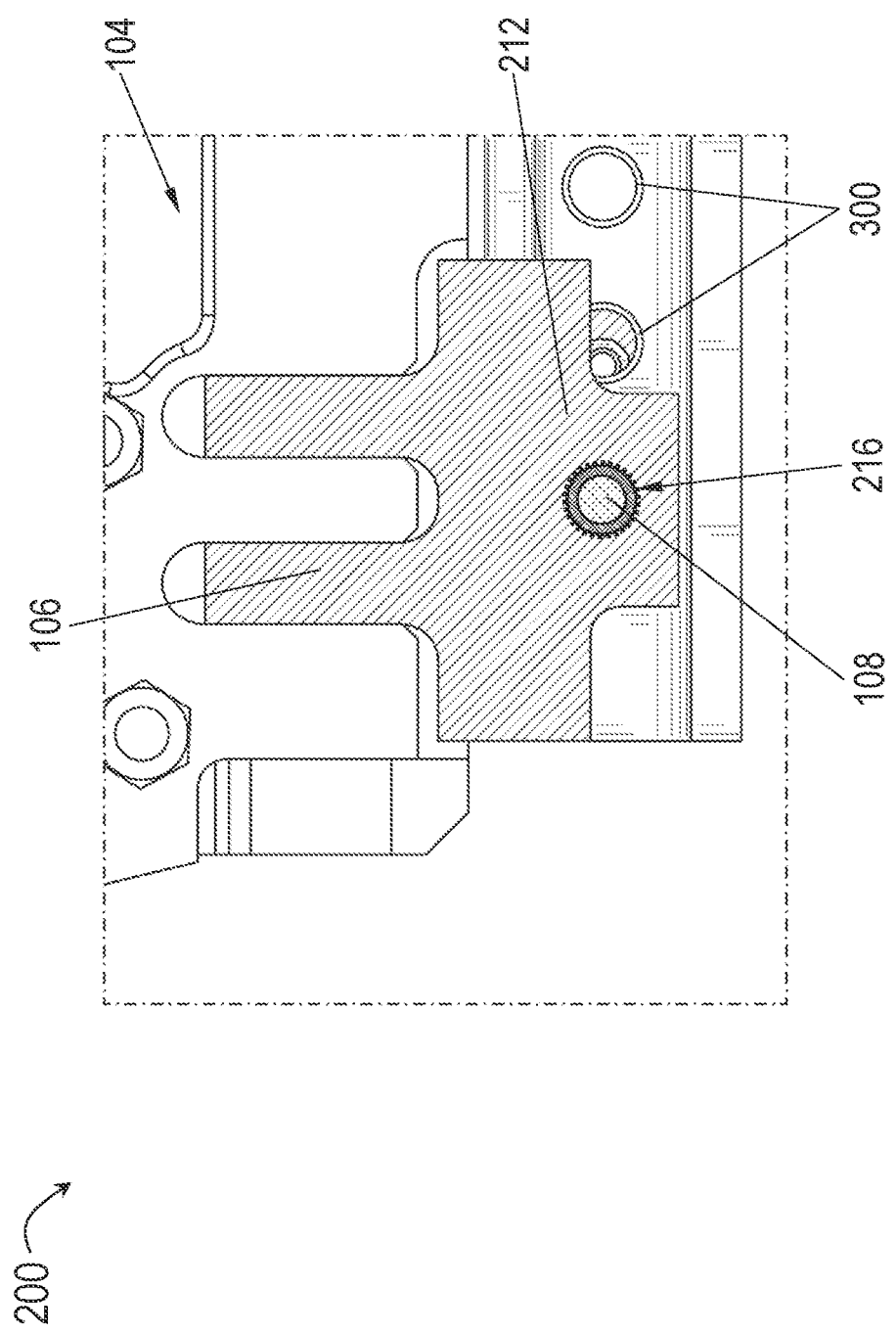
FIG. 3 is an external view of the double-shear locking assembly of FIG. 1.

Referring also to FIG. 3, the detailed view 200 of the vehicle seating assembly is shown in a side view, e.g., perpendicular to the cross-sectional view of FIG. 2.

Figure 4:
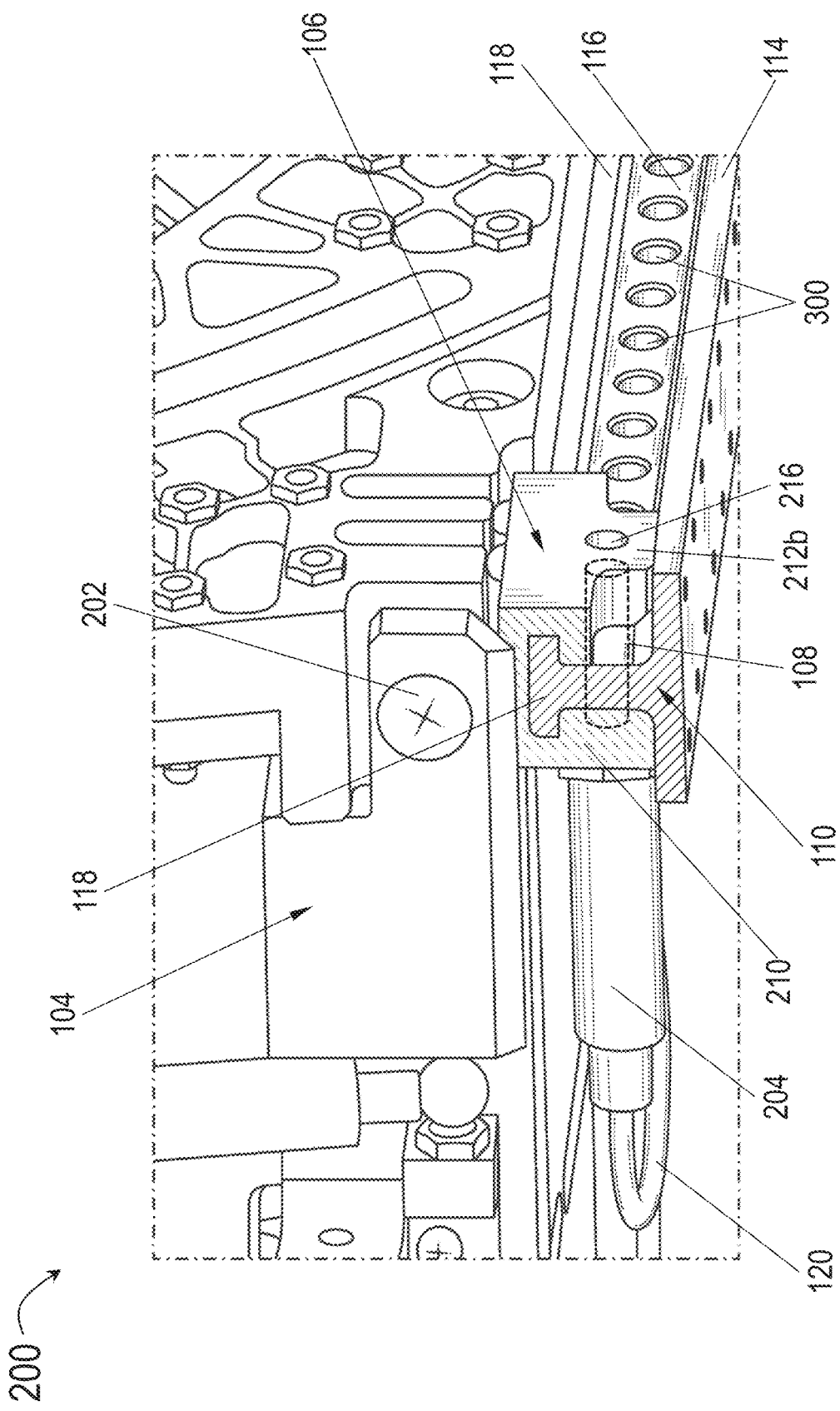
FIG. 4 is an isometric view of the double-shear locking assembly of FIG. 1.

Referring also to FIG. 4, the detailed view 200 of the vehicle seating assembly is shown in an isometric view.

In some embodiments, referring in particular to FIGS. 3 and 4, the locking pin 108 may extend substantially fully through the right-side portion 212 of the floor track gripper 106 (e.g., in addition to the left-side portion 210), such that when the locking pin is in the engaged mode, the terminal edge of the locking pin may rest substantially flush with the outer wall 212b of the right-side portion of the floor track gripper. This may have the added benefit of preventing the accumulation of dirt or debris within the otherwise open portion of the hole 216.

Embodiments of the inventive concepts disclosed herein enhance occupant safety by keeping the operator seat intact with the cabin floor in the event of an emergency landing or impact event. For example, under high loading conditions and/or twisting loads a single-shear joint may fail, causing the seat to break away from the cabin floor tracks and putting the occupant at risk of serious injury. The double-shear locking pin reduces the likelihood of the seat breaking loose from the cabin floor tracks.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A double shear secured vehicle seating assembly, comprising:
    a seat frame structure capable of supporting a vehicle seat;
    at least one floor track gripper attached to the seat frame structure, each floor track gripper configured to secure the seat frame structure to a floor track set into a floor of a vehicle,
    the floor track including 1) a rail extending parallel to the floor, a plurality of evenly spaced first holes extending through the rail from a left side to a right side thereof, and 2) an upper portion extending perpendicular to the rail and parallel to the floor;
    each floor track gripper including a left-side portion and a right-side portion extending downward from a base, the base attached to the seat frame structure, the left-side and right-side portions configured to extend around and below the upper portion of the rail on its left and right sides respectively, each of the left-side and right-side portions including a second hole extending fully therethrough in alignment with the plurality of first holes;
    and
    a locking pin configured to secure the floor track gripper to the floor track when in an engaged state, the locking pin extending fully through the left-side second hole, fully through a first hole of the plurality of first holes, and at least partially through the right-side second hole when in the engaged state.

2. The double shear secured vehicle seating assembly of claim 1, wherein:
    the locking pin is connected via at least one cable to a control lever, the control lever articulable by an occupant of the seat to transition the locking pin between the engaged state and a disengaged state.

3. The double shear secured vehicle seating assembly of claim 2, wherein:
    the locking pin is set into a housing and held in the engaged state by at least one spring within the housing; and
    wherein the control lever is configured for:
        retracting the locking pin into the housing by compressing the at least one spring;

and
returning the locking pin to the engaged state by releasing the at least one spring.

4. The double shear secured vehicle seating assembly of claim 1, wherein:
the locking pin extends fully through the right-side second hole when in the engaged state.

5. A double shear secured vehicle seating assembly, comprising:
a vehicle seat configured to accommodate an operator of a vehicle;
a seat frame structure capable of supporting the vehicle seat;
at least one floor track gripper attached to the seat frame structure, each floor track gripper configured to secure the seat frame structure to a floor track set into a floor of the vehicle,
the floor track including at least 1) a rail extending parallel to the floor, a plurality of evenly spaced first holes extending through the rail from a left side to a right side thereof, and 2) an upper portion extending perpendicular to the rail and parallel to the floor,
each floor track gripper including a left-side portion and a right-side portion extending downward from a base, the base attached to the seat frame structure, the left-side and right-side portions configured to extend around and below the upper portion of the rail on its left and right sides respectively, each of the left-side and right-side portions including a second hole extending fully therethrough in alignment with the plurality of first holes;
and
a locking pin configured to secure the floor track gripper to the floor track when in an engaged state, the locking pin extending fully through the left-side second hole, fully through a first hole of the plurality of first holes, and at least partially through the right-side second hole when in the engaged state.

6. The double shear secured vehicle seating assembly of claim 5, wherein:
the locking pin is connected via at least one cable to a control lever, the control lever articulable by an occupant of the seat to transition the locking pin between the engaged state and a disengaged state.

7. The double shear secured vehicle seating assembly of claim 6, wherein:
the locking pin is set into a housing and held in the engaged state by at least one spring within the housing; and
wherein the control lever is configured for:
retracting the locking pin into the housing by compressing the at least one spring;
and
returning the locking pin to the engaged state by releasing the at least one spring.

8. The double shear secured vehicle seating assembly of claim 5, wherein:
the locking pin extends fully through the right-side second hole when in the engaged state.

* * * * *